United States Patent
Han (10) Patent No.: US 8,554,230 B2
(45) Date of Patent: Oct. 8, 2013

(54) METHOD AND APPARATUS FOR ALLOCATING FEMTO CELL INFORMATION FOR HANDOVER IN A WIRELESS COMMUNICATION SYSTEM

(75) Inventor: Jeong-Hyun Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/510,113

(22) PCT Filed: Nov. 19, 2010

(86) PCT No.: PCT/KR2010/008198
§ 371 (c)(1),
(2), (4) Date: May 16, 2012

(87) PCT Pub. No.: WO2011/062439
PCT Pub. Date: May 26, 2011

(65) Prior Publication Data
US 2012/0276903 A1    Nov. 1, 2012

(30) Foreign Application Priority Data

Nov. 19, 2009    (KR) .................. 10-2009-0112128

(51) Int. Cl.
*H04W 36/00*    (2009.01)

(52) U.S. Cl.
USPC ............ 455/438; 455/439; 455/436; 370/331

(58) Field of Classification Search
USPC .......................... 455/438, 439, 436; 370/331
See application file for complete search history.

(56) References Cited

U.S. PATENT DOCUMENTS

| 6,532,365 B1 * | 3/2003 | Anderson et al. ............ 455/437 |
| 6,947,469 B2 * | 9/2005 | Anderson et al. ............ 375/141 |
| 8,280,387 B2 * | 10/2012 | Guvenc et al. ................ 455/449 |
| 2009/0233605 A1 | 9/2009 | Kim |
| 2009/0247170 A1 | 10/2009 | Balasubramanian et al. |

FOREIGN PATENT DOCUMENTS

KR    10-2007-0046482 A    5/2007

* cited by examiner

*Primary Examiner* — Danh Le
(74) *Attorney, Agent, or Firm* — Jefferson IP Law, LLP (57) ABSTRACT

A method and an apparatus for allocating femto cell allocation information to support handover from a cell of a Base Station (BS) to a femto cell in a wireless communication system are provided. The method includes setting a start frequency of a beacon signal to be different from a start frequency of a neighbor femto cell, sequentially hopping a beacon frequency beginning from the start frequency, and allocating new femto cell information based on the frequency hopping.

20 Claims, 9 Drawing Sheets

METHOD AND APPARATUS FOR ALLOCATING FEMTO CELL INFORMATION FOR HANDOVER IN A WIRELESS COMMUNICATION SYSTEM

PRIORITY

This application is a National Stage application under 35 U.S.C. §371 of an International application filed on Nov. 19, 2010 and assigned application No. PCT/KR2010/008198, and claims the benefit under 35 U.S.C. §365(b) of a Korean patent application filed Nov. 19, 2009 in the Korean Intellectual Property Office and assigned application No. 10-2009-0112128, the entire disclosure of which is hereby incorporated by reference.

FIELD OF THE INVENTION

The present invention relates to femto cells in a wireless communication system. More particularly, the present invention relates to a method and apparatus for allocating femto cell information to support handover from a cell of a Base Station (BS) to a femto cell in a wireless communication system.

DESCRIPTION OF THE RELATED ART

A femto cell is a low-power wireless access point operating in a spectrum to be authorized to connect Mobile Stations (MSs) to a wireless communication system using Housing Digital Subscriber Line (DSL) or broadband cable connection.

A Base Station (BS) of a common wireless communication system has a service radius of several kilometers to tens of kilometers and provides services to a plurality of users, whereas a femto cell has a service radius of several meters to tens of meters and provides services only to users in a home or office. A network configuration for the femto cells and its components are under standardization in standards organizations such as 3rd Generation Partnership Project (3GPP) and 3rd Generation Partnership Project-2 (3GPP2).

Figure 1:
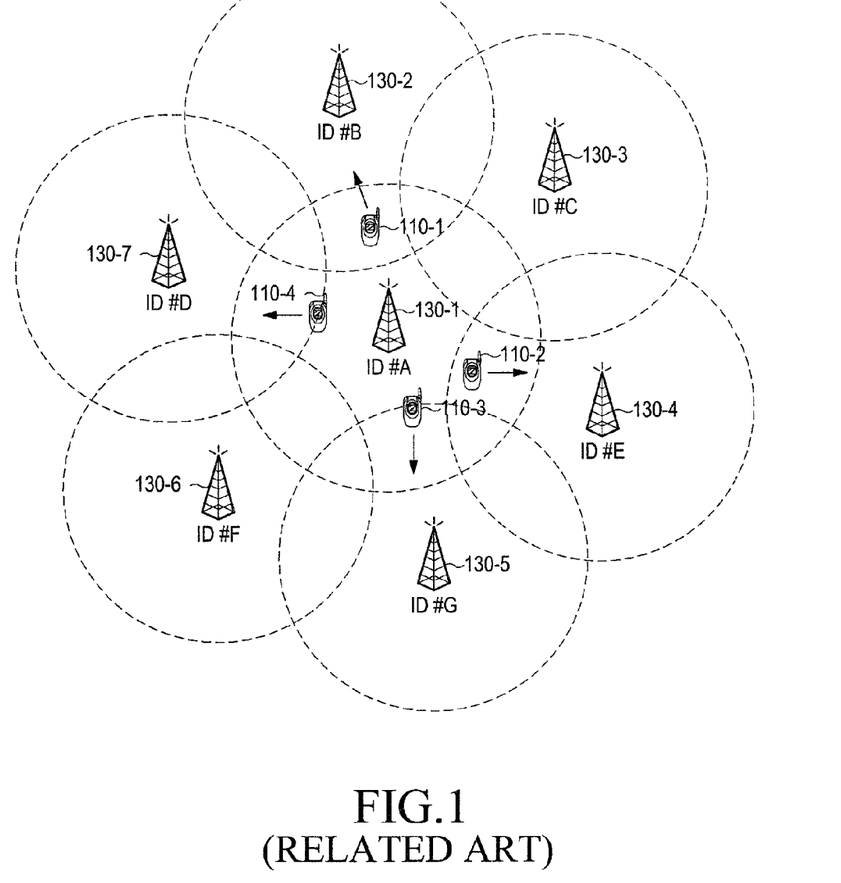
FIG. 1 is a diagram schematically illustrating a configuration of a common wireless communication system in which a plurality of Base Stations (BSs) communicate with MSs according to the related art.

FIG. 1 schematically illustrates a configuration of a common wireless communication system in which a plurality of BSs communicate with Mobile Stations (MSs) according to the related art.

Referring to FIG. 1, to allow MSs 110-1~110-4 (110) to perform handover when moving between BSs 130-1~130-7, a neighbor message, in which identification information ID#B~ID#G for neighbor BSs 130-2~130-7 of a serving BS 130-1 presently being accessed by the MSs 110 is included, is sent to the MSs 110. The MSs 110 located in coverage of the serving BS 130-1 receive the neighbor message sent from the serving BS 130-1.

In FIG. 1, the MSs 110 periodically search for neighbor BSs 130-2~130-7 using a received neighbor message for handover to the neighbor BSs 130-2~130-7. If there are neighbor BSs 130-2~130-7 whose receive sensitivities are higher than a receive sensitivity of the serving BS 130-1 by a predetermined value or more, the MSs 110 attempt handover to the neighbor BSs.

Figure 2:
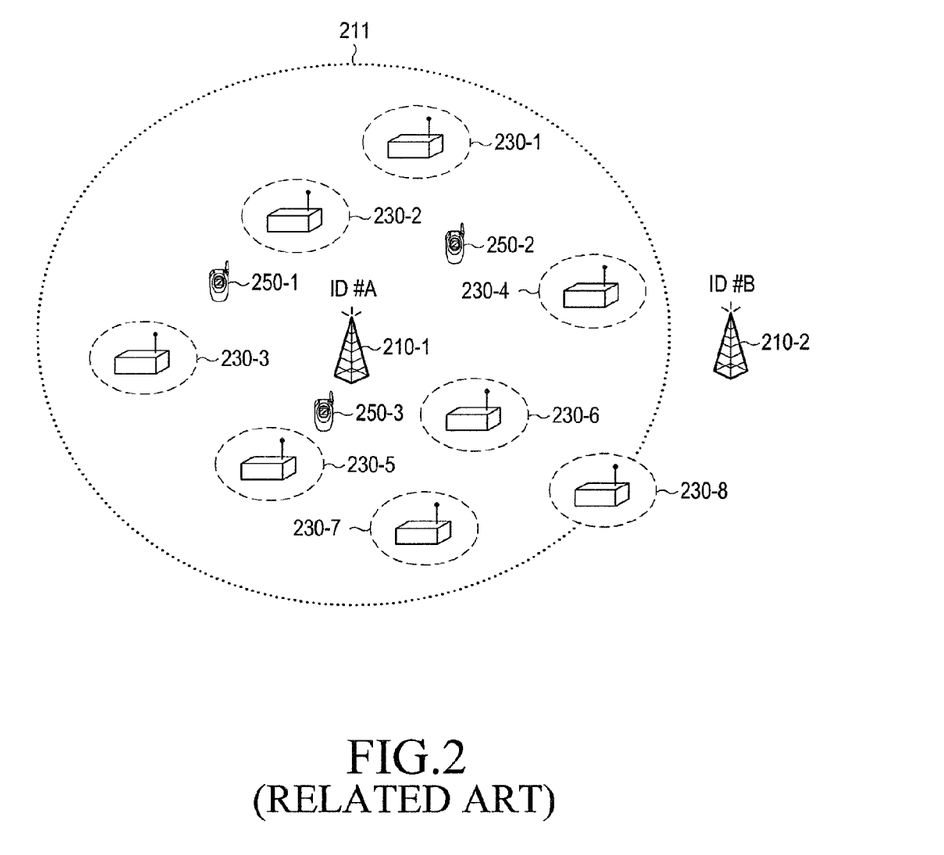
FIG. 2 is a diagram illustrating an exemplary configuration of a wireless communication system in which a plurality of femto cells are arranged in a cell of a BS according to the related art.

FIG. 2 illustrates an exemplary configuration of a wireless communication system in which a plurality of femto cells are arranged in a cell of a BS according to the related art.

Referring to FIG. 2, a BS 210-1 of the wireless communication system transmits femto cell information using a neighbor message so that MSs 250-1~250-3 (250) may be handed over to femto cells 230-1~230-8 (230). The MSs 250 measure receive sensitivities of the femto cells 230 to which they intend to perform handover, based on the femto cell information included in the neighbor message, and depending thereon, perform handover from a cell 211 of the BS 210-1 to the femto cells 230.

Figure 3:
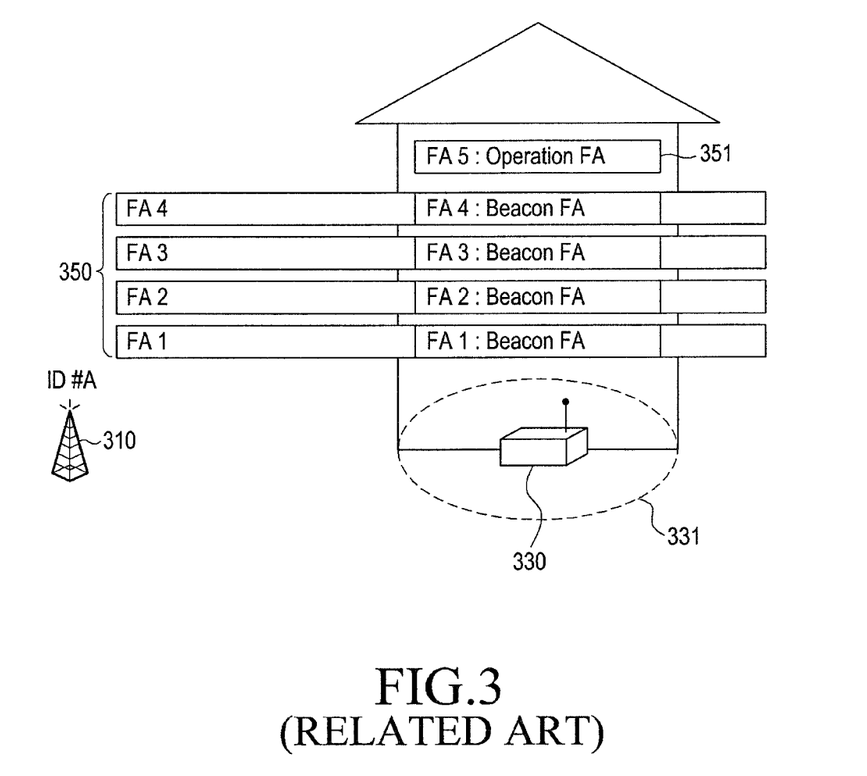
FIG. 3 is a diagram illustrating an existing frequency allocation scheme in a BS and a femto cell of a wireless communication system according to the related art.

FIG. 3 illustrates an existing frequency allocation scheme in a BS and a femto cell of a wireless communication system according to the related art.

Referring to FIG. 3, Frequency Assignments FA1~FA4, represented by reference numeral 350, are frequencies allocable to MSs by a BS 310. Each MS is allocated one of the frequencies FA1~FA4 and performs communication using the allocated FA. It is assumed that a femto cell BS 330 providing services in a femto cell 331 is located in coverage of the BS 310. The femto cell BS 330 performs beacon FAs that use the same frequencies as FAs 350 of the BS 310 so that MSs may perform handover from the cell of the BS 310 to the femto cell 331. The beacon FAs are for handover, and once handed over, a relevant MS is allocated an operation frequency (or an operation FA) 351 and performs communication using the allocated operation frequency in the femto cell 331.

In the wireless communication system according to the related art, a BS delivers only information about neighbor BSs to MSs using a neighbor message. However, as femto cells are arranged in a cell of a BS, a new scheme has been proposed, in which the BS additionally transmits femto cell information using a neighbor message so as to support handover of MSs. The amount of femto cell information (i.e., the amount of information about femto cells) that may be included in the neighbor message is limited, though different according to the wireless standards such as Code Division Multiple Access (CDMA), Wideband CDMA (WCDMA), Worldwide Interoperability for Microwave Access (WiMax), and Long Term Evolution (LTE). At present, therefore, wireless carrier operators set the amount of femto cell information that can be included in a neighbor message to the same limited number of 1 to 3 in all wireless communication systems.

Accordingly, in the wireless communication system, if a plurality of femto cells are arranged in a cell of a BS, stable handover cannot be supported due to the limited femto cell information. Accordingly, there is a need for a plan to stably perform handover from a cell of a common BS (or a macro BS) to a femto cell regardless of the amount of information about femto cells and the arrangement of the femto cells.

SUMMARY OF THE INVENTION

Aspects of the present invention are to address at least the above-mentioned problems and/or disadvantages and to provide at least the advantages described below. Accordingly, an aspect of the present invention is to provide a method and apparatus for allocating femto cell information to support stable handover from a cell of a BS to a femto cell in a wireless communication system.

Another aspect of the present invention is to provide a method and apparatus for allocating femto cell information, which is not affected by the number of femto cells and/or the arrangement of the femto cells in a wireless communication system.

Another aspect of the present invention is to provide a method and apparatus for allocating frequencies and/or identification information of femto cells to stably perform handover from a cell of a BS to a femto cell in a wireless communication system.

In accordance with an aspect of the present invention, a method for allocating femto cell information for handover by a femto cell Base Station (BS) in a wireless communication system is provided. The method includes setting a start frequency of a beacon signal to be different from a start frequency of a neighbor femto cell, sequentially hopping a beacon frequency beginning from the start frequency, and allocating new femto cell information based on the frequency hopping.

In accordance with another aspect of the present invention, a femto cell BS for allocating femto cell information for handover in a wireless communication system is provided. The femto cell BS includes a first modem for modulating and demodulating transmission/reception signals using an operation frequency of the femto cell BS, a second modem for modulating a beacon signal using a beacon frequency of the femto cell BS, and for transmitting the modulated beacon signal, and a controller for controlling operations of the first and second modems, and for controlling an operation of setting a start frequency of the beacon signal to be different from a start frequency of a neighbor femto cell, sequentially hopping a beacon frequency beginning from the start frequency, and allocating new femto cell information using the frequency hopping.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For a better understanding of exemplary embodiments of the present invention, reference will first be made to an existing scheme of allocating femto cell information in a case where a plurality of femto cells are arranged in a cell of a common Base Station (BS). An exemplary embodiment of the present invention is directed to an allocation scheme for femto cell information, and since a handover procedure from a cell of a BS to a femto cell may be performed in the known method, a detailed description of the handover procedure will be omitted so as not to obscure the subject matter of the present invention.

Figure 4:
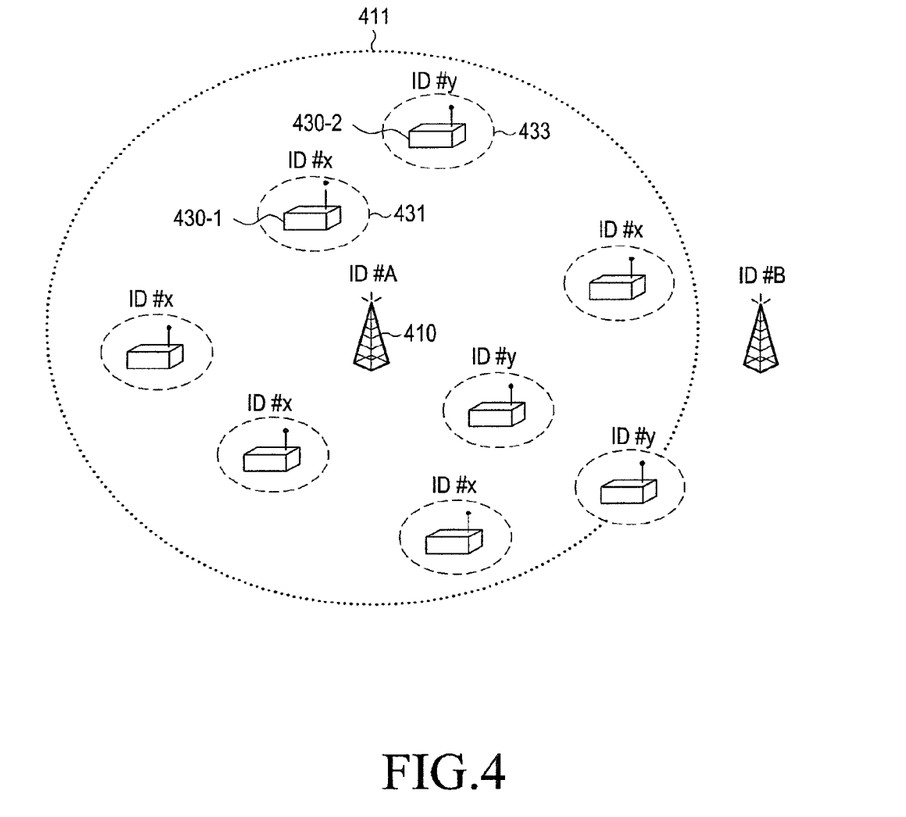
FIG. 4 is a diagram illustrating an example of a wireless communication system in which a plurality of femto cells are arranged in a cell of a BS according to an exemplary embodiment of the present invention.

FIG. 4 illustrates an example of a wireless communication system in which a plurality of femto cells are arranged in a cell of a BS according to an exemplary embodiment of the present invention.

Referring to FIG. 4, a plurality of femto cells 431, 433, . . . , which are coverages of femto cell BSs 430-1, 430-2, . . . , are arranged in a cell 411 of a BS 410. The femto cells 431, 433, . . . are allocated the same femto cell information and share the information due to the limited amount of femto cell information transmitted using a neighbor message of the BS 410. The femto cell information included in the neighbor message includes identification (ID) information of femto cells. For example, in FIG. 4, two limited femto cell information of ID #x and ID #y are allocated to femto cells on a shared basis. Accordingly, some of the femto cells 431, 433, . . . are allocated the femto cell information ID #x, and the other femto cells are allocated the femto cell information ID #y. In FIG. 4, the BS 410 inserts two femto cell information ID #x and ID #y in a neighbor message. A specific femto cell allocates a selected one of ID #x and ID #y, so its Mobile Station (MS) may perform handover from the BS 410 to the femto cell. In the case of FIG. 4, coverages of the femto cells 431, 433, . . . may overlap if a large number of the femto cells 431, 433, . . . are installed in a densely populated area (e.g., an apartment). In addition, if two or more femto cells provide services using the same ID in an area where their coverage overlap, MSs may not perform stable handover, recognizing them as interference.

An exemplary embodiment of the present invention will be described below on the assumption that a plurality of femto cells are arranged in a cell of a BS as in FIG. 4.

According to an exemplary embodiment of the present invention, a BS of a wireless communication system transmits femto cell information including ID information of femto cells to MSs using a neighbor message. Femto cell BSs providing services in their femto cells handle at least one operation frequency and a plurality of beacon frequencies for handover of MSs independently, and during the services, hop a plurality of beacon frequencies at specific periods, i.e., at periods of a beacon hopping duration as shown in FIG. 5 so that beacon frequencies of neighbor femto cells may not overlap at the same time.

A plurality of Frequency Assignments (FAs) used by the BS of the wireless communication system may be used as they are, as the beacon frequencies. When moving from a cell of a BS to a femto cell, an MS may perform handover by checking a receive sensitivity of the same beacon frequency of a femto cell as the FA now in service in the BS. To this end, a femto cell BS provides services by time-multiplexing its allocable FAs.

Figure 5:
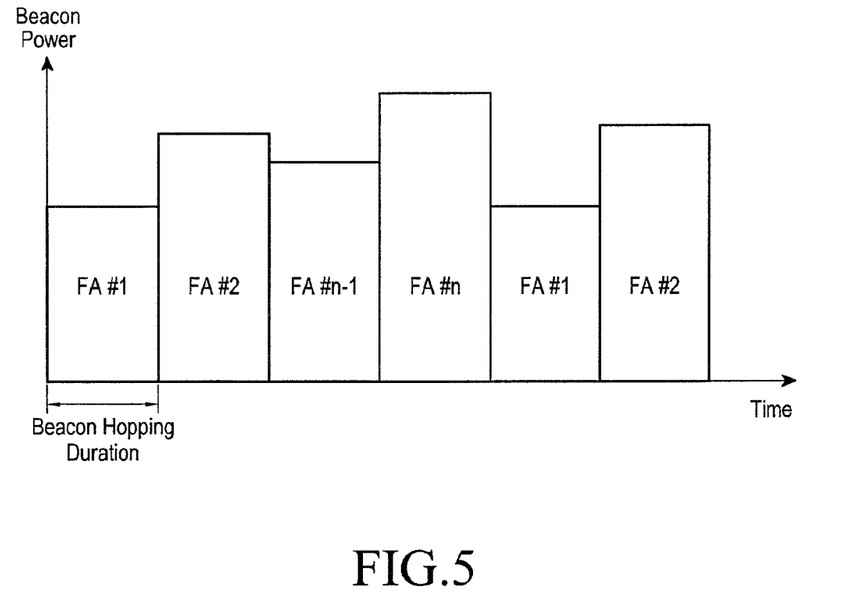
FIG. 5 is a diagram illustrating a beacon frequency hopping scheme according to an exemplary embodiment of the present invention.

FIG. 5 is a diagram illustrating a beacon frequency hopping scheme according to an exemplary embodiment of the present invention.

Referring to FIG. 5, each femto cell is allocated n beacon frequencies FA#1~FA#n, for handover of MSs. During services, the femto cell hops the n beacon frequencies FA#1~FA#n in order of FA#1=>FA#2=>FA#n−1=>FA#n at periods of the beacon hopping duration. The beacon hopping duration may be set as the same value for all femto cells in the wireless communication system. According to an exemplary embodiment of the present invention, if a femto cell A provides services by allocating a beacon frequency FA#1 at a specific time, a femto cell B adjacent to the femto cell A may provide services by allocating, for example, a beacon frequency FA#2 at the same point of time.

In accordance with the above frequency hopping scheme, neighbor femto cells use different beacon frequencies at every beacon hopping duration, and may identify femto cells that use the same femto cell ID information. Each femto cell BS sets new femto cell information identified using the frequency hopping scheme, as ID information of its femto cell. According to an exemplary embodiment of the present invention, neighbor femto cells are equal in femto cell information included in a neighbor message, but different in the new femto cell information set by their femto cell BSs.

According to an exemplary embodiment of the present invention, a plurality of femto cell BSs which are different in ID information of their femto cells and/or start frequencies of their beacon frequencies, may allocate the new femto cell information to be distinguished according to a predetermined scheme. In an alternative embodiment, the new femto cell information may be allocated to femto cells by an independent server connected to the plurality of femto cell BSs. In another alternative embodiment, the plurality of femto cell BSs may allocate distinguishable new femto cell information by communicating with one another.

Accordingly, the present invention addresses the interference problems during handover, which occur between neighbor femto cells using the same ID information.

As described above, according to an exemplary embodiment of the present invention, femto cell information included in a neighbor message of a BS includes the limited amount of ID information of femto cells as in the related art. The new femto cell information allocated for identification of femto cells is created to be distinguishable according to a predetermined format. The new femto cell information is distinguishable because femto cell BSs use the frequency hopping scheme.

A femto cell information allocation method according to an embodiment of the present invention is described below with reference to FIGS. 6 and 7.

Figure 6:
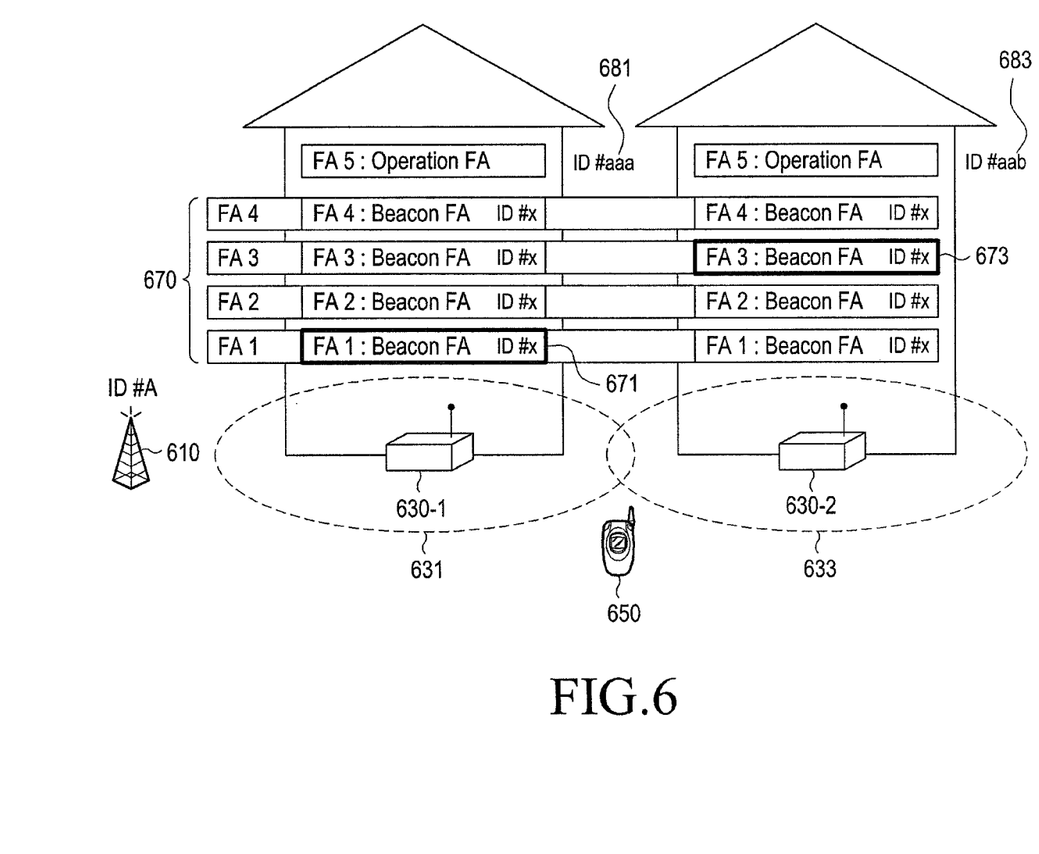
FIG. 6 is a diagram illustrating a femto cell information allocation method using a beacon frequency hopping scheme according to an exemplary embodiment of the present invention.

FIG. 6 illustrates a femto cell information allocation method using a beacon frequency hopping scheme according to an exemplary embodiment of the present invention.

Referring to FIG. 6, a BS 610 of a wireless communication system transmits ID information of at least one femto cell to MSs as femto cell information, using a neighbor message. Femto cell BSs 630-1 and 630-2 allocate new femto cell information of their femto cells 631 and 633 using the above frequency allocation scheme to enable handover from a cell of the BS 610 to one of the femto cells 631 and 633. It is assumed herein that the femto cells 631 and 633 use, for example, the same ID information ID#x, and the BS 610 sends a neighbor message with the ID information ID#x included in it. Therefore, based on the ID information ID#x included in the neighbor message, MSs may perform handover from the cell of the BS 610 to one of the femto cells 631 and 633. According to an exemplary embodiment of the present invention, the handover from a cell of a BS to a femto cell includes handover of an MS in an idle state.

The femto cell BSs 630-1 and 630-2 match a hopping time of beacon frequencies to a Global Positioning System (GPS) time, and set start frequency values of beacons of neighbor femto cells to be different from each other, as shown by reference numerals 671 and 673. The hopping time of the beacon frequencies may be matched using the GPS, and the femto cell BSs 630-1 and 630-2 set the start frequency values of their beacons to be different from each other. For example, FIG. 6 shows an example in which the femto cell BS 630-1 sets a start frequency of a beacon as FA1 671, and its neighbor femto cell BS 630-2 sets a start frequency of a beacon as FA3 673. In the example of FIG. 6, the BS 610 uses four frequencies FA1~FA4, and a total of four femto cells may be arranged adjacent to each other because even though only the same ID information ID#x is allocated to femto cells, four different beacon frequencies may be allocated at the same time.

In this manner, different beacon frequencies are allocated to adjacent femto cells using the frequency hopping scheme, and new femto cell information allocated using the allocation scheme may be distinguished from each other as shown by reference numerals 681 and 683. In the example of FIG. 6, the femto cell information mapped to the femto cell 631 is defined as ID#aaa, and the femto cell information mapped to the neighbor femto cell 633 is defined as ID#aab. As a result, the wireless communication system can support interference-free handover between neighbor femto cells based on the new femto cell information.

In accordance with the above-described exemplary embodiment of the present invention, if the number of FAs used in the BS 610 is N and the amount of femto cell information, i.e., IDs of femto cells, inserted in a neighbor message by the BS 610 is M, the amount of femto cell information allocated using the frequency hopping scheme may be extended to N*M as shown in Table 1. Accordingly, N*M femto cells using the same ID information may be arranged adjacent to each other.

Table 1 below shows exemplary combinations of N beacon frequencies available in femto cells and M femto cell IDs predetermined in the wireless communication system, i.e., M ID information of femto cells.

TABLE 1

| (FA#1, ID#1) | (FA#1, ID#2) |   | (FA#1, ID#M) |   |
|---|---|---|---|---|
| (FA#2, ID#1) | (FA#2, ID#2) |   | (FA#2, ID#M) |   |
|   |   |   |   |   |
| (FA#N, ID#1) | (FA#N, ID#2) |   | (FA#N, ID#M) |   |

According to the exemplary combinations in Table 1, even though the original femto cell information ID#1~ID#M included in a neighbor message are identical, if start frequencies of beacon frequencies are different, distinguishable new femto cell information may be allocated. In Table 1, the number of allocable new femto cell information is equal to M*N. Therefore, according to an exemplary embodiment of the present invention, femto cells having the same operation frequency may be distinguished.

Figure 7:
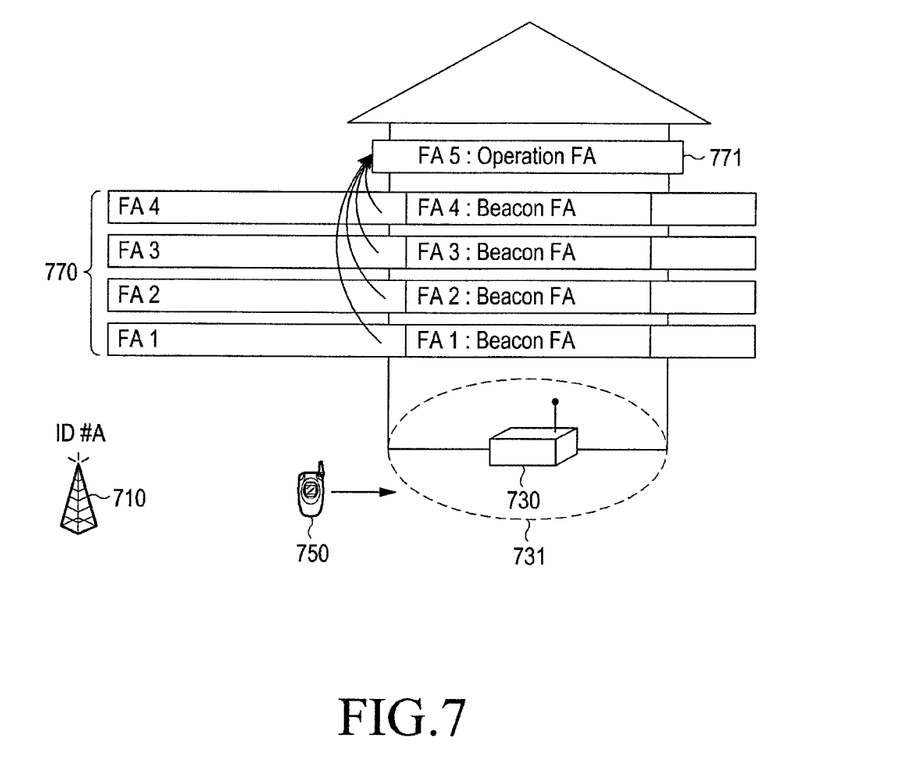
FIG. 7 is a diagram illustrating an operation of performing frequency redirection from a beacon frequency to an operation frequency by a Mobile Station (MS) according to an exemplary embodiment of the present invention.

FIG. 7 is a diagram illustrating an operation of performing frequency redirection from a beacon frequency to an operation frequency by an MS according to an exemplary embodiment of the present invention.

Referring to FIG. 7, an operation is illustrated in which, after handed over from a cell of a BS 710 to a femto cell 731, an MS 750 performs frequency redirection and inter-FA handover from beacon frequencies 770 to an operation frequency 771 according to an exemplary embodiment of the present invention. The reason why inter-FA handover to an operation frequency is performed in a femto cell as shown in FIG. 7 is that the beacon frequencies are for handover of MSs and actual services are performed using the operation frequency.

For inter-FA handover to the operation frequency 771, a femto cell BS 730 generates a frequency redirection message with operation frequency information of its femto cell 731 and sends the frequency redirection message to an MS 750 having performed the handover, and the MS 750 receives the frequency redirection message and performs inter-FA handover from the beacon frequency to the operation frequency indicated by the frequency redirection message.

Figure 8:
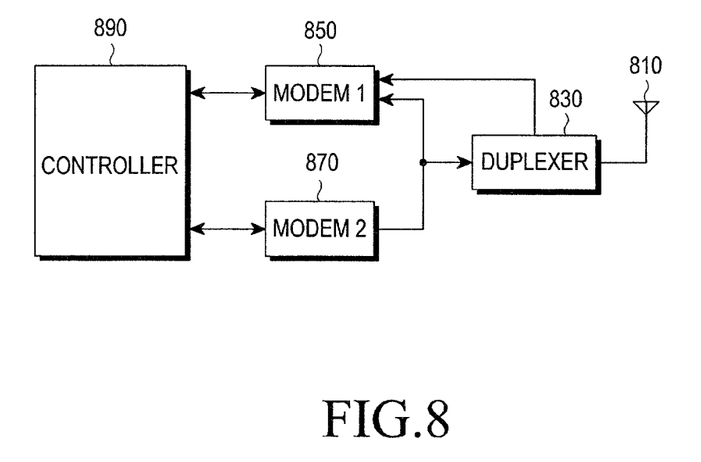
FIG. 8 is a block diagram illustrating a structure of a femto cell BS performing femto cell information allocation according to an exemplary embodiment of the present invention.

FIG. 8 is a block diagram illustrating a structure of a femto cell BS performing femto cell information allocation according to an exemplary embodiment of the present invention.

Referring to FIG. 8, a femto cell BS handles at least one operation frequency and a plurality of beacon frequencies for handover of MSs independently, and during services, hops a plurality of available beacon frequencies at periods of a beacon hopping duration so that beacon frequencies of neighbor femto cells may not overlap at the same time.

In the femto cell BS, an antenna 810 transmits/receives radio signals, and a duplexer 830 separates signals transmitted through the antenna 810 from signals received via the antenna 810. A first modem 850 modulates/demodulates signals transmitted/received using an operation frequency of the femto cell BS, and a second modem 870 modulates a beacon signal using one of beacon frequencies of the femto cell BS and transmits the modulated beacon signal. A controller 890 controls operations of the first and second modems 850 and 870 to transmit a beacon signal using beacon frequencies and transmit a service signal using an operation frequency. If the first and second modems 850 and 870 are provided with, or connected to, independent antennas, then the duplexer 830 is optional.

Figure 9:
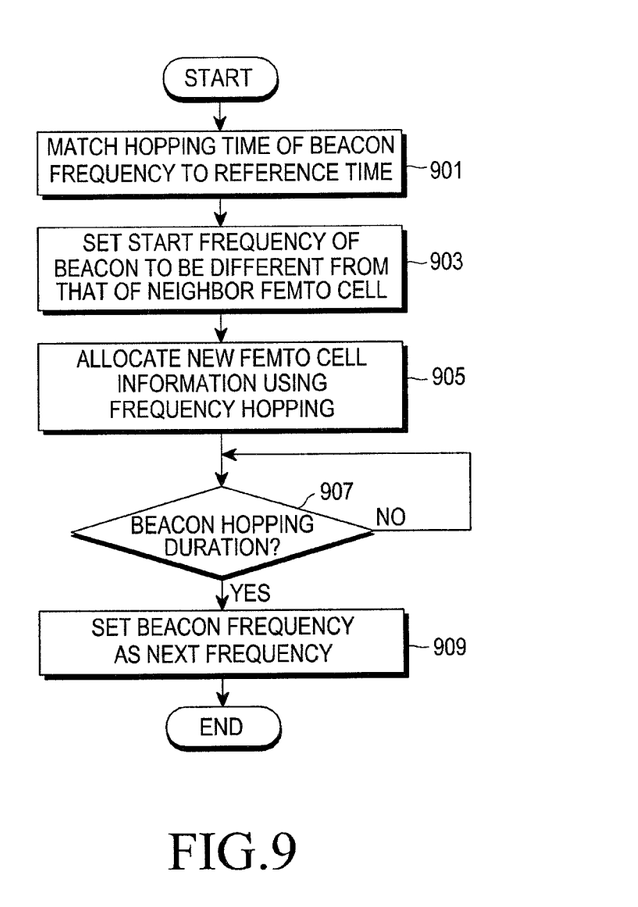
FIG. 9 is a flowchart illustrating an operation of a controller for controlling femto cell information allocation according to an exemplary embodiment of the present invention.

FIG. 9 is a flowchart illustrating an operation of the controller 890 for controlling femto cell information allocation according to an exemplary embodiment of the present invention.

Referring to FIG. 9, the controller 890 matches a hopping time of beacon frequencies to a reference time in step 901 according to the frequency hopping scheme described in FIGS. 5 to 7. The same reference time may be set for all femto cells arranged in a cell of a BS by using, for example, the GPS. In step 903, the controller 890 sets a start frequency of a beacon signal to be different from a start frequency of a neighbor femto cell. In step 905, the controller 890 allocates frequency hopping-based new femto cell information to a relevant femto cell. While the new femto cell information is assumed to be allocated by a femto cell BS, a separate server (not shown) connected to a plurality of femto cell BSs may allocate the new femto cell information to respective femto cells, or the femto cell BSs may allocate distinguishable new femto cell information by communicating with each other. Regardless of the method used to allocate new femto cell information, since neighbor femto cells are different in terms of the start frequency of the beacon signal, the new femto cell information allocated to the neighbor femto cells is substantially distinguishable. The controller 890 determines in step 907 whether the beacon hopping duration has come, and if not so, the controller 890 maintains the current beacon frequency. Otherwise, the controller 890 sets the beacon frequency as the next frequency in step 909.

As is apparent from the foregoing description, according to an exemplary embodiment of the present invention, even though the number of femto cells arranged in a cell of a BS increases in a wireless communication system, the amount of femto cell information included in a neighbor message is fixed to a small number, contributing to providing MSs with a stable handover service. In addition, interference signals generated between neighbor femto cells using the same ID information may be prevented, facilitating flexible deployment of femto cells.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for allocating femto cell information for handover by a femto cell Base Station (BS) in a wireless communication system, the method comprising:
   setting a start frequency of a beacon signal of the femto cell BS to be different from a start frequency of a neighbor femto cell BS;
   sequentially hopping a beacon frequency of the femto cell BS beginning from the start frequency; and
   allocating new femto cell information to the femto cell BS based on the frequency hopping.

2. The method of claim 1, further comprising matching a frequency hopping time of the beacon frequency to a reference time.

3. The method of claim 2, wherein the reference time is set via a Global Positioning System (GPS).

4. The method of claim 1, wherein the femto cell BS is arranged in a cell of a BS in the wireless communication system.

5. The method of claim 4, wherein the BS sends a neighbor message including identification information of the femto cell BS to a Mobile Station (MS) in the cell of the BS; and
   wherein the new femto cell information is different from the identification information of the femto cell BS, which is transmitted by the BS.

6. The method of claim 4, wherein the femto cell BS hops a plurality of beacon frequencies and uses the plurality of beacon frequencies in sequence; and wherein the plurality of beacon frequencies are identical in frequency to a plurality of Frequency Assignments (FAs) allocated by the BS.

7. The method of claim 4, wherein a number of available new femto cell information is a value obtained by multiplying a number of the available beacon frequencies by a number of identification information of the each femto cell BS in the BS, which are included in the neighbor message.

8. The method of claim 1, wherein identification information of a neighbor femto cell is equal to identification information of a femto cell BS.

9. The method of claim 1, wherein an MS, which has been handed over using the beacon frequency, receives a service using an operation frequency allocated by the femto cell BS.

10. The method of claim 1, wherein the handover includes handover of an MS in an idle state.

11. A femto cell Base Station (BS) for allocating femto cell information for handover in a wireless communication system, the femto cell BS comprising:

a first modem for modulating and demodulating transmission/reception signals using an operation frequency of the femto cell BS;

a second modem for modulating a beacon signal using a beacon frequency of the femto cell BS, and for transmitting the modulated beacon signal; and a controller for controlling operations of the first and second modems, and for controlling an operation of setting a start frequency of the beacon signal to be different from a start frequency of a neighbor femto cell BS, sequentially hopping a beacon frequency beginning from the start frequency, and allocating new femto cell information using the frequency hopping.

12. The femto cell BS of claim 11, wherein the controller matches a frequency hopping time of the beacon frequency to a reference time.

13. The femto cell BS of claim 12, wherein the reference time is set using a Global Positioning System (GPS).

14. The femto cell BS of claim 11, wherein the femto cell BS is arranged in a cell of a BS in the wireless communication system.

15. The femto cell BS of claim 14, wherein the BS sends a neighbor message including identification information of the femto cell BS to a Mobile Station (MS) in the cell of the BS; and wherein the new femto cell information is different from identification information of the femto cell BS, which is transmitted by the BS.

16. The femto cell BS of claim 14, wherein the controller hops a plurality of beacon frequencies and uses the plurality of beacon frequencies in sequence, and the plurality of beacon frequencies are identical in frequency to a plurality of Frequency Assignments (FAs) allocated by the BS.

17. The femto cell BS of claim 14, wherein a number of available new femto cell information is a value obtained by multiplying a number of the available beacon frequencies by a number of each femto cell BS in the BS, which are included in the neighbor message.

18. The femto cell BS of claim 11, wherein identification information of a neighbor femto cell BS is equal to identification information of a femto cell BS.

19. The femto cell BS of claim 11, wherein an MS, which has been handed over using the beacon frequency, receives a service using an operation frequency allocated by the femto cell BS.

20. The femto cell BS of claim 11, wherein the handover includes handover of an MS in an idle state.

* * * * *